United States Patent
Johnson

(10) Patent No.: US 11,410,108 B2
(45) Date of Patent: Aug. 9, 2022

(54) METHODOLOGY AND SYSTEM FOR DYNAMIC LIGHTWEIGHT PERSONALIZED ANALYTICS

(71) Applicant: Sandra K. Johnson, Cary, NC (US)

(72) Inventor: Sandra K. Johnson, Cary, NC (US)

( * ) Notice: Subject to any disclaimer, the term of this patent is extended or adjusted under 35 U.S.C. 154(b) by 0 days.

(21) Appl. No.: 17/013,895

(22) Filed: Sep. 8, 2020

(65) Prior Publication Data
US 2021/0073704 A1 Mar. 11, 2021

Related U.S. Application Data

(60) Provisional application No. 62/897,360, filed on Sep. 8, 2019.

(51) Int. Cl.
*G06Q 10/06* (2012.01)
*G06Q 40/06* (2012.01)

(52) U.S. Cl.
CPC ....... *G06Q 10/06393* (2013.01); *G06Q 40/06* (2013.01)

(58) Field of Classification Search
None
See application file for complete search history.

(56) References Cited

U.S. PATENT DOCUMENTS

| | | | |
|---|---|---|---|
| 7,774,271 B1 | 8/2010 | Edwards et al. | |
| 9,443,268 B1 | 9/2016 | Kapczynski et al. | |
| 10,062,109 B1* | 8/2018 | Poursartip | G06Q 10/06315 |
| 10,176,522 B1* | 1/2019 | Lockwood-Stein | G06Q 40/06 |
| 10,453,086 B1* | 10/2019 | Scott | G06Q 20/24 |
| 10,552,902 B1* | 2/2020 | Lockwood-Stein | G06Q 40/02 |
| 10,692,140 B1* | 6/2020 | Kim | G06Q 40/025 |
| 10,796,363 B1* | 10/2020 | Kim | G06Q 20/20 |
| 10,872,362 B1* | 12/2020 | Shearer | G06Q 30/0224 |
| 10,902,512 B1* | 1/2021 | Fern | G06Q 20/02 |
| 2008/0242274 A1* | 10/2008 | Swanburg | G06Q 30/00 455/414.1 |
| 2009/0228375 A1 | 9/2009 | Ford et al. | |
| 2012/0116957 A1* | 5/2012 | Zanzot | G06Q 20/326 705/39 |
| 2013/0054396 A1 | 2/2013 | Goldfinger et al. | |
| 2013/0325679 A1* | 12/2013 | Yeri | G06Q 40/02 705/35 |
| 2013/0339234 A1* | 12/2013 | Prakash | G06Q 30/0255 705/41 |

(Continued)

OTHER PUBLICATIONS

U.S. Appl. No. 17/137,677, filed Dec. 2020, Johnson.
U.S. Appl. No. 16/914,629, filed Jun. 2020, Johnson.
U.S. Appl. No. 17/084,778, filed Oct. 2020, Johnson.

*Primary Examiner* — Leland Marcus
(74) *Attorney, Agent, or Firm* — Hunton Andrews Kurth LLP

(57) ABSTRACT

An embodiment of the present invention is directed to a feedback-based system and methodology for dynamic lightweight personalized analytics (DLPA). Disclosed embodiments include a process for dynamically leveraging various inputs such as behavioral and other analytics types, and using a small number of dynamically adjusted parameters, a small memory footprint and optimal computation, to deliver behavioral and other suggestions for customer behavior. In addition, certain actions are cancelled, prior to their completion, based on new, dynamically discovered customer behaviors.

20 Claims, 7 Drawing Sheets

(56) References Cited

U.S. PATENT DOCUMENTS

| | | | |
|---|---|---|---|
| 2014/0012648 A1* | 1/2014 | Grimes | G06Q 30/0207 705/14.23 |
| 2014/0081787 A1* | 3/2014 | Blackhurst | G06Q 30/00 705/26.1 |
| 2014/0164224 A1* | 6/2014 | Grigg | G06Q 40/02 705/39 |
| 2014/0207550 A1* | 7/2014 | Eden | G06Q 30/06 705/14.23 |
| 2014/0365354 A1* | 12/2014 | Shvarts | G06Q 30/02 705/38 |
| 2015/0073952 A1 | 3/2015 | Ventura et al. | |
| 2015/0379488 A1 | 12/2015 | Ruff et al. | |
| 2016/0260069 A1 | 9/2016 | Holman et al. | |
| 2017/0161289 A1 | 6/2017 | Ignatowicz et al. | |
| 2018/0096337 A1* | 4/2018 | Ascencio Rios | G06Q 20/327 |
| 2018/0096344 A1* | 4/2018 | Ascencio Rios | G06Q 20/3572 |
| 2018/0114216 A1 | 4/2018 | Joseph et al. | |
| 2018/0268487 A1 | 9/2018 | Matthews et al. | |
| 2019/0213660 A1* | 7/2019 | Astrada | G06F 16/9535 |
| 2019/0303889 A1 | 10/2019 | Cho | |
| 2020/0034805 A1 | 1/2020 | Lee et al. | |
| 2020/0097955 A1 | 3/2020 | Gandhi et al. | |
| 2020/0219025 A1* | 7/2020 | Conte | G06Q 10/06393 |
| 2020/0412817 A1* | 12/2020 | Ranjan | H04L 67/306 |

* cited by examiner

METHODOLOGY AND SYSTEM FOR DYNAMIC LIGHTWEIGHT PERSONALIZED ANALYTICS

CROSS REFERENCE TO RELATED APPLICATIONS

This application claims priority to U.S. Provisional Application 62/897,360, filed Sep. 8, 2019, the contents of which are incorporated herein in their entirety.

This application relates to U.S. application Ser. No. 16/914,629, filed Jun. 29, 2020, which claims priority to U.S. Provisional Application 62/868,950, filed Jun. 30, 2019, the contents of which are incorporated herein in their entirety.

FIELD OF THE INVENTION

The disclosed teachings relate generally to leveraging consumer data dynamically to conduct fast, behavioral analytics with a small footprint to gain personalized insights for actions. Further, such actions may be terminated prior to completion based on newly discovered customer behaviors. Potential participants include those in consumer-focused industries and entities, and analytics.

BACKGROUND

Many consumer-based companies leverage customer data and associated predictive, prescriptive, and other analytic methodologies to gain insights. Such information can translate into suggestions to improve efficiencies, understand trends, create new potential markets, or discover or prevent fraud, to name a few. There is an abundance of analytics efforts conducted to gain such insights. With an increasingly consumer-centric society, there is a growing focus on behavioral analytics to understand customer preferences that can translate into market gains. Much of this work leverages a plethora of structured and unstructured data that may be siloed and geographically dispersed for insights.

There are many consumer-focused industries that require small, lightweight, and fast analytics. For example, the prevailing focus in the remittance industry is the transfer of funds from sender to receiver. The transfer amounts are small, and users require minimal transfer times. Moreover, with thin industry profit margins it is important that all efforts to assist in transferring funds are efficient, lightweight, and fast. In this and many other industries, there are no significant efforts to build customer relationships, understand their wants, needs and behaviors, and build customer loyalty. However, a study has shown that businesses that develop strong customer connections outperform their competitors by 85% in sales growth and more than 25% in gross margin.

There are some efforts to use analytics in the remittance industry. For example, current systems use analytics to understand global remittance market trends. Others use analytics to discover glitches or behavior anomalies and detect and prevent fraud. Most focus on overall trends and patterns, not individual behaviors, to gain insights for unique customer offerings. Currently, there are no efforts to develop lightweight personalized analytics methodologies to gain insights for customized services real time.

These and other drawbacks exist.

SUMMARY OF THE INVENTION

Accordingly, one aspect of the invention is to address one or more of the drawbacks set forth above. An embodiment of the present invention is directed to a system for providing dynamic lightweight personalized analytics (DLPA). The system comprises: an interface that receives one or more inputs via an enterprise payments services bus; a data store that stores and manages DLPA metrics; and a dynamic lightweight personalized analytics engine comprising a computer processor and coupled to the interface, the computer processor configured to perform the steps of: receiving one or more customer parameters and remittance trends; accessing, via a customer account database, one or more key performance indicators (KPIs); accessing one or more DLPA metrics; wherein the DLPA metrics are impacted by one or more responses to a customer remittance suggestion; adjusting each of the one or more DLPA metrics for a predetermined time window for an individual customer; the step of adjusting comprising: setting DLPA default values for time window (TW); for the time window, calculate a new KPI in a KPI array; applying a favorability metric that determines whether to keep a current metric or remove the current metric; dynamically processing a plurality of transaction data based on the one or more adjusted DLPA metrics to achieve memory conservation and optimal computation; based on the processing step, generating a set of remittance suggestions and financial suggestions; and communicating the set of remittance suggestions and financial suggestions.

Another embodiment of the present invention is directed to method for providing dynamic lightweight personalized analytics (DLPA). The method comprises the steps of: receiving, via an interface, one or more customer parameters and remittance trends; accessing, via a customer account database, one or more key performance indicators (KPIs); accessing one or more DLPA metrics; wherein the DLPA metrics are impacted by one or more responses to a customer remittance suggestion; adjusting, via a dynamic lightweight personalized analytics engine comprising a computer processor, each of the one or more DLPA metrics for a predetermined time window for an individual customer; the step of adjusting comprising: setting DLPA default values for time window (TW); for the time window, calculate a new KPI in a KPI array; applying a favorability metric that determines whether to keep a current metric or remove the current metric; dynamically processing a plurality of transaction data based on the one or more adjusted DLPA metrics to achieve memory conservation and optimal computation; based on the processing step, generating a set of remittance suggestions and financial suggestions; and communicating the set of remittance suggestions and financial suggestions.

According to another embodiment of the present invention, a computer-readable medium comprising instructions which, when executed by a computer, cause the computer to carry out steps of: receiving, via an interface, one or more customer parameters and remittance trends; accessing, via a customer account database, one or more key performance indicators (KPIs); accessing one or more DLPA metrics; wherein the DLPA metrics are impacted by one or more responses to a customer remittance suggestion; adjusting, via a dynamic lightweight personalized analytics engine comprising a computer processor, each of the one or more DLPA metrics for a predetermined time window for an individual customer; the step of adjusting comprising: setting DLPA default values for time window (TW); for the time window, calculate a new KPI in a KPI array; applying a favorability metric that determines whether to keep a current metric or remove the current metric; dynamically processing a plurality of transaction data based on the one or more adjusted DLPA metrics to achieve memory conservation and optimal computation; based on the processing step, generating a set of remittance suggestions and financial suggestions; and communicating the set of remittance suggestions and financial suggestions.

The computer implemented system, method and medium described herein provide unique advantages to entities, organizations, merchants, and other users (e.g., consumers, etc.), according to various embodiments of the invention. An embodiment of the present invention is directed to providing dynamic lightweight personalized analytics (DLPA). The various embodiments include a feedback-based system and methodology for dynamic lightweight personalized analytics (DLPA). Disclosed embodiments include a process for dynamically leveraging various inputs such as behavioral and other analytics types, and using a small number of dynamically adjusted parameters, a small memory footprint and optimal computation, to deliver behavioral and other suggestions for customer behavior. In addition, certain actions are cancelled, prior to their completion, based on new, dynamically discovered customer behaviors. These and other advantages will be described more fully in the following detailed description.

BRIEF DESCRIPTION OF THE DRAWINGS

To facilitate a fuller understanding of the present inventions, reference is now made to the appended drawings. These drawings should not be construed as limiting the present inventions but are intended to be exemplary only.

DESCRIPTION OF EMBODIMENTS OF THE INVENTION

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to a system and methodology for dynamic lightweight personalized analytics (DLPA), a new innovative technology designed to provide individual analytics to gain insights for developing personalized offerings to build relationships with the customer. DLPA leverages a limited number of customer-specific, industry-focused input parameters, other inputs, and a small footprint.

Figure 1:
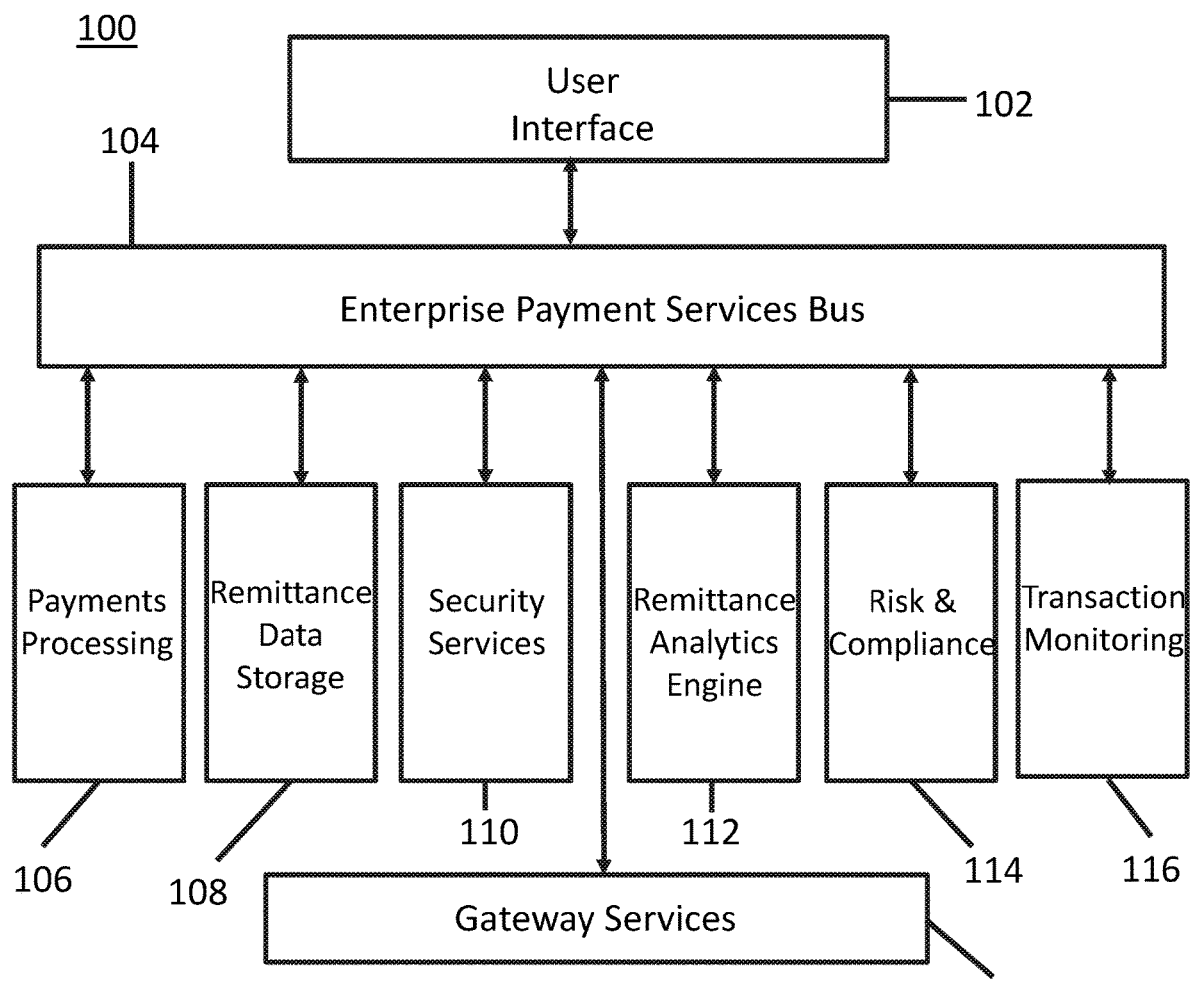
FIG. 1 is a block diagram of a remittance payments service-oriented architecture, in accordance with exemplary embodiments of the disclosure.

FIG. 1 is a schematic block diagram illustrating one embodiment of the service-oriented architecture (SOA) 100 of a remittance system designed to process transactions, in accordance with one embodiment of the present invention. The system 100, in one embodiment, includes a user interface 102 that enables a user to send or receive requests, etc. This user interface 102 interacts with the enterprise payments services bus 104 to request or receive services. The enterprise payments services bus 104 may be configured to transmit data between engines, databases, memories, and other components of the system 100 for use in performing the functions discussed herein.

The enterprise payments services bus 104 may include one or more communication types and utilize various communication methods for communications within a computing device. For example, the enterprise payments services bus 104 may include a bus, contact pin connectors, wires, etc. In some embodiments, the enterprise payments services bus 104 may also be configured to communicate between internal components of system 100 and external components accessible through gateway services 118, such as externally connected databases, display devices, input devices, etc.

There are several services that may compose this SOA 100, including payments processing 106, remittance data storage 108, security services 110, the remittance analytics engine 112, risk and compliance 114, transaction monitoring 116, and gateway services 118, which are described below. Each of these service components may be software, a computer-readable program, executing on one of more processors and may include a mainframe computer, a workstation, a desktop computer, a computer in a smart phone, a computer system in a rack, a computer system in a cloud, a physical system, a virtual system, and the like.

The system 100, in one embodiment, is the SOA of a remittance system and is a network of software service components in which the illustrative embodiments may be implemented. The system 100 includes a user interface 102 used by a consumer. The consumer represents a person, a software program, a virtual program, or any other entity that has possession of, can emulate, or other otherwise issue commands to execute transactions in the system 100. The system 100 includes an enterprise payment services bus 104 which accepts and processes commands from the user interface 102 and other system components. It also enables communication among the various services components in the system 100.

As a part of executing a remittance request, the transaction may leverage payments processing 106 to process the request. The transaction may also access remittance data storage 108 which is a resource for data access. Security services 110 are also leveraged to ensure the full security and integrity of funds and data, and to detect and prevent fraud. In addition, the remittance analytics engine 112 may be leveraged and serve as the foundation for DLPA. This engine takes as input a plethora of information from the remittance data storage 108 and other components that may enable the remittance analytics engine 112 to optimize its outputs. The risk and compliance 114 service may provide customer identification, verification, and other similar services to comply with relevant governmental regulations and to minimize risk. The transaction monitoring 116 service tracks funds transfer behavior and other activities to detect anomalies that may point to fraud. It may further work in concert with security services 110.

Gateway services 118 enable the transfer of funds, data, requests, etc. to externally connected entities for further processing. Such entities may include a computer network, a financial institution, and others that may participate in end-to-end remittance or other funds transfer or data services. Other similar embodiments will be apparent to persons having skill in the relevant art.

Figure 2:
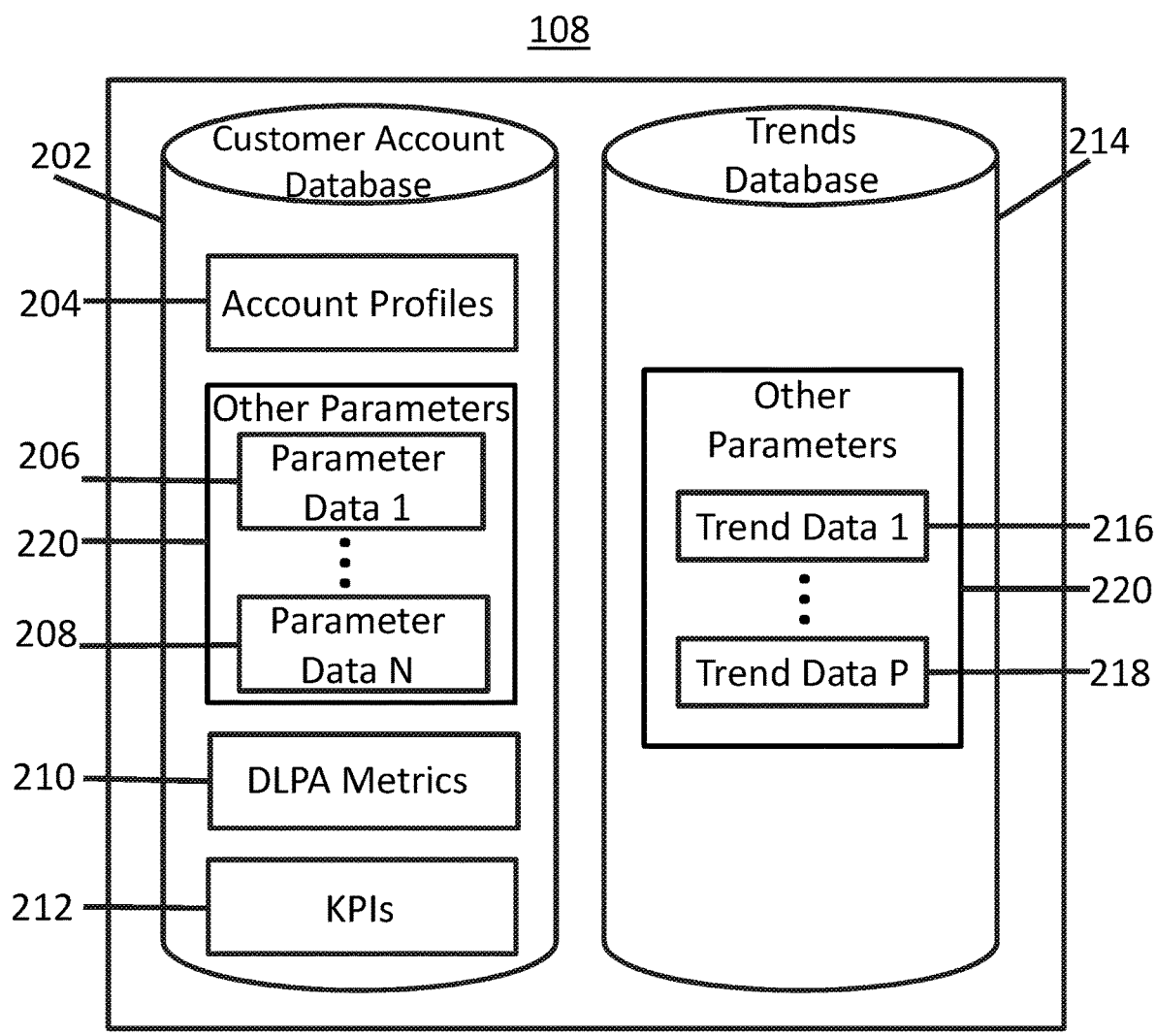
FIG. 2 is a block diagram of a remittance data storage, in accordance with exemplary embodiments of the disclosure.

FIG. 2 is a schematic block diagram illustrating one embodiment of the remittance data storage service 108 used in the processing of information requests. The remittance data storage 108 may be a relational database, or a collection of relational databases, that utilizes structured query language for the storage, identification, modifying, updating, accessing, etc. of structured data sets stored therein. This data storage 108 may include a customer account database 202 that contains customer account and other related customer information. The customer account database 202 may be configured to store a plurality of consumer account profiles 204 as well as a plurality of customer parameter data 206 and 208 using a suitable data storage format and schema.

Each customer account profile 204 may be a structured data set configured to store data related to a remittance account. Each customer account profile 204 may include at least the customer's full name, address, telephone number, birthdate, birth country, a remittance account number, a bank account number, credit card account information, email address, a list of recipients and associated international mobile telephone numbers, remittance transaction history, a postal mailing address, an email address, and other relevant information. The customer account profile 204 may also include additional information suitable for customer service programs, customer and vendor optimizations, and regulations, such as product data, offer data, loyalty data, reward data, usage data, currency-exchange data, mobile money data, fraud scoring, validity of funds, and transaction/account controls. The customer account profile 204 may also include additional information that may be used for know-your-customer (KYC) and anti-money laundering (AML) regulations. It may further contain information suitable for performing the functions discussed herein, such as communication details for transmitting via the enterprise payment services bus 104.

The customer parameter data 206 and 208 may include a wealth of various types or facts or other data (see FIG. 3) about the customer. It is a component of other parameters 220 that may be used as input or output information for the remittance analytics engine 112. The customer account database 202 may also include DLPA metrics 210 designed to quantify success. Example DLPA metrics may include the recommendation acceptance rate, recommendation impact, acceptance impact, financial account acceptance rate, and financial recommendation impact. In addition, those skilled in the art will understand this is a representative embodiment. There are other similar metrics that may be used in other embodiments. DLPA metrics may be used to trigger when to dynamically update parameters or resources used.

The customer parameter data 206 and 208 may also include the customer temperament information, which may be predicted via social media data 308 or the number of times the customer contacts support, for example. Furthermore, the customer account database 202 may include key performance indicators (KPIs) 212. For example, representative KPIs may include the total funds transferred per customer, the total number of transfers per customer, the total number of recipients per customer and the total balances in all financial accounts per customer. KPIs may represent metrics used to evaluate the performance of an application or business.

Also contained in the remittance data storage 108 is the trends database 214. It contains a plurality of trend data 216 and 218 that compose the other parameters 220 that may be used as input information for the remittance analytics engine 112. Examples of trend data include average remittance amounts over all customers, remittance frequencies and time frames, remittance geographies, remittance increases over holidays or special occasions, and other similar metrics. Other similar embodiments will be apparent to persons having skill in the relevant art.

Figure 3:
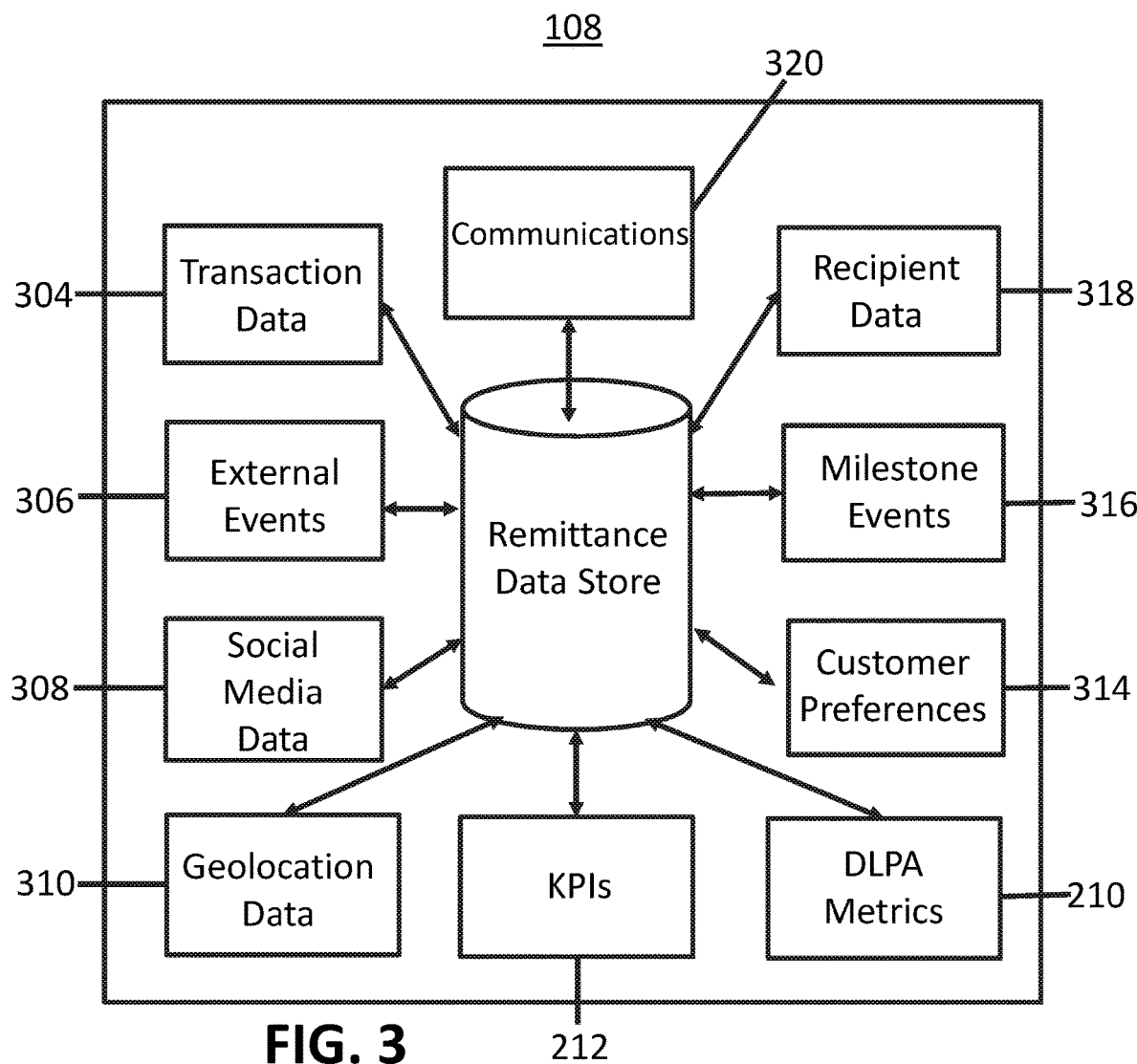
FIG. 3 is a block diagram of the types of data stored in a remittance data storage, in accordance with exemplary embodiments of the disclosure.

Presented in FIG. 3. is a schematic block diagram illustrating one embodiment of specifics regarding the plurality of data that may be stored in the remittance data storage 108. This data may be stored as structured data sets that may include transaction data 304, external events data 306, social media data 308, geolocation data 310, KPIs 212, DLPA metrics 210, customer preferences 314, milestone events 316, recipient data 318 and communications data 320.

Example transaction data 304 may include the transfer amount, transfer time, recipient name and international mobile number, the time period since the last transfer initiated by the sender to any receiver, time period since the last transfer initiated by the sender to a specific receiver, and the final status of a transaction (e.g., completed, cancelled, etc.). Additional data may include metrics to quantify customer sentiments such as the number of times or frequency that the customer contacted support, time with support, and support outcomes.

Example external events 306 include general remittance transaction data (transfer amounts, frequency, etc.) for other customers using the specific remittance service or for remittance customers using any remittance service, public holidays for the sender and receiver countries, natural disasters, immigration policies, the price of oil, global and local recessions.

Example social media data 308 may include messages (e.g., SMS messages) exchanged between sender and receiver, between sender and the remittance service provider and between receiver and remittance service provider, and social media posts (e.g., Facebook, Twitter, Instagram, LinkedIn, etc.).

Example geolocation data 310 may include the physical location of sender and receiver when the funds transfer is initiated or received or the physical location of the sender or receiver at specific or random times. Other similar embodiments will be apparent to persons having skill in the relevant art.

Example customer preferences 314 are from the perspective of the sender. They may include hobbies, favorite things to do and financial preferences. Furthermore, DLPA enables the creation of a financial or other account by the customer to save for the future. This account may be created and funded statically or dynamically. A customer preference 314 may include the customer's desire to create a separate account (or some other activity) based on DLPA analytics, to choose the type of account to create and to determine how to fund the account. For example, a customer preference 314 may be to create a financial or other account when registering for the remittance service, or upon DLPA recommendations when using the remittance service. There are many types of accounts to be created. The customer may choose between creating a bank account for education, starting a business, donating to a charity or some other option for the sender and/or the receiver. The choices may be general (e.g., the same type of account for sender and each recipient), for each recipient, or variable (e.g., a different type of account depending on the recipient or a group of recipients). Other similar embodiments will be apparent to persons having skill in the relevant art.

Example milestone events 316 may include birthdays, including milestone birthdays (e.g., 18, 25, 30, etc.), weddings, anniversaries, graduations, and other special days for the sender or receiver.

Example recipient data 318 may include full name, international telephone number and recipient preferences that are like customer preferences 314.

Communications data 320 may include the recent types of communications between sender, receiver, the remittance service provider, and external entities. Other similar embodiments will be apparent to persons having skill in the relevant art.

Figure 4:
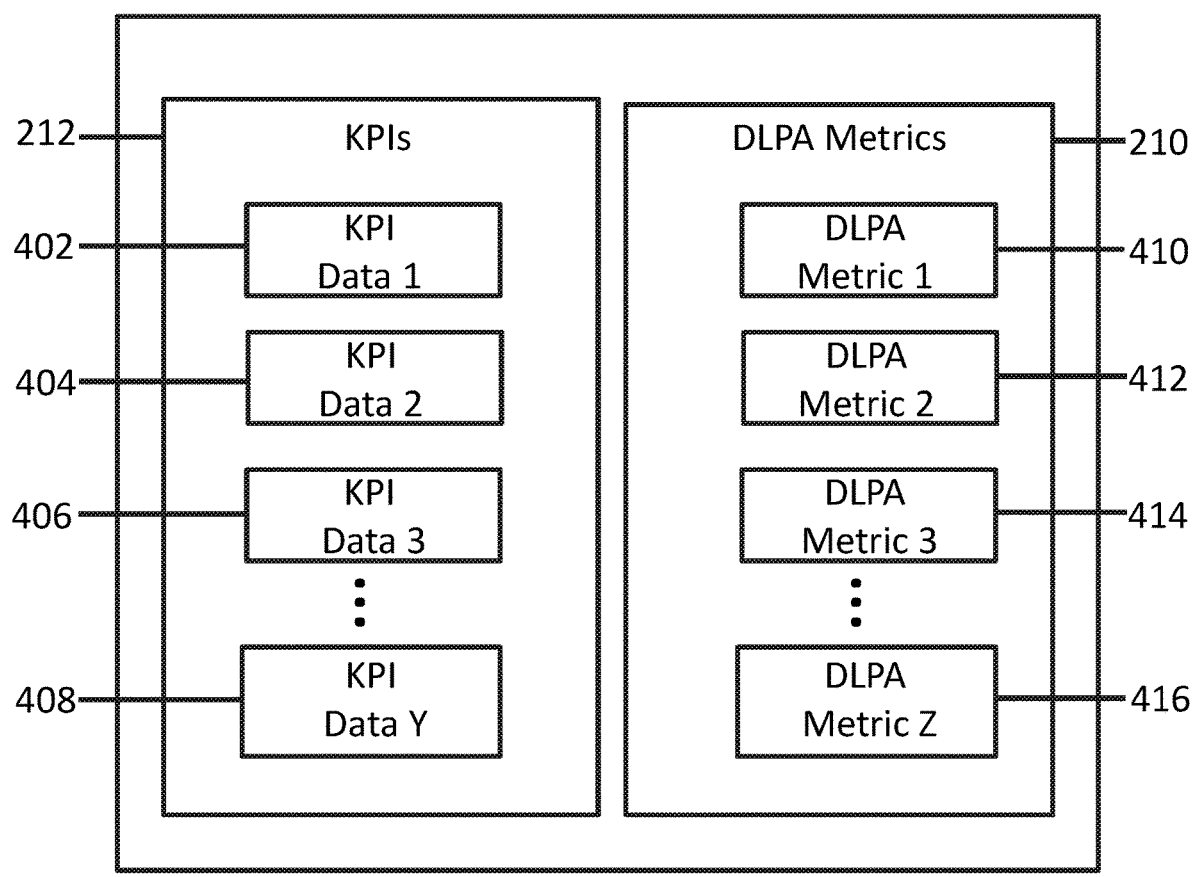
FIG. 4 is a block diagram of the partial contents of a remittance data store, in accordance with exemplary embodiments of the disclosure.

FIG. 4 is a schematic block diagram illustrating one embodiment of the remittance data storage 108 that contains the KPIs 212 and DLPA Metrics 210. As shown in FIG. 4, there is a plurality of KPIs 212: 402, 404, 406, and 408, contained in the remittance data storage 108, as illustrated in FIG. 4. Also illustrated in FIG. 4 is a plurality of DLPA Metrics 210: 410, 412, 414, and 416. These metrics are contained in the remittance data storage 108.

Figure 5:
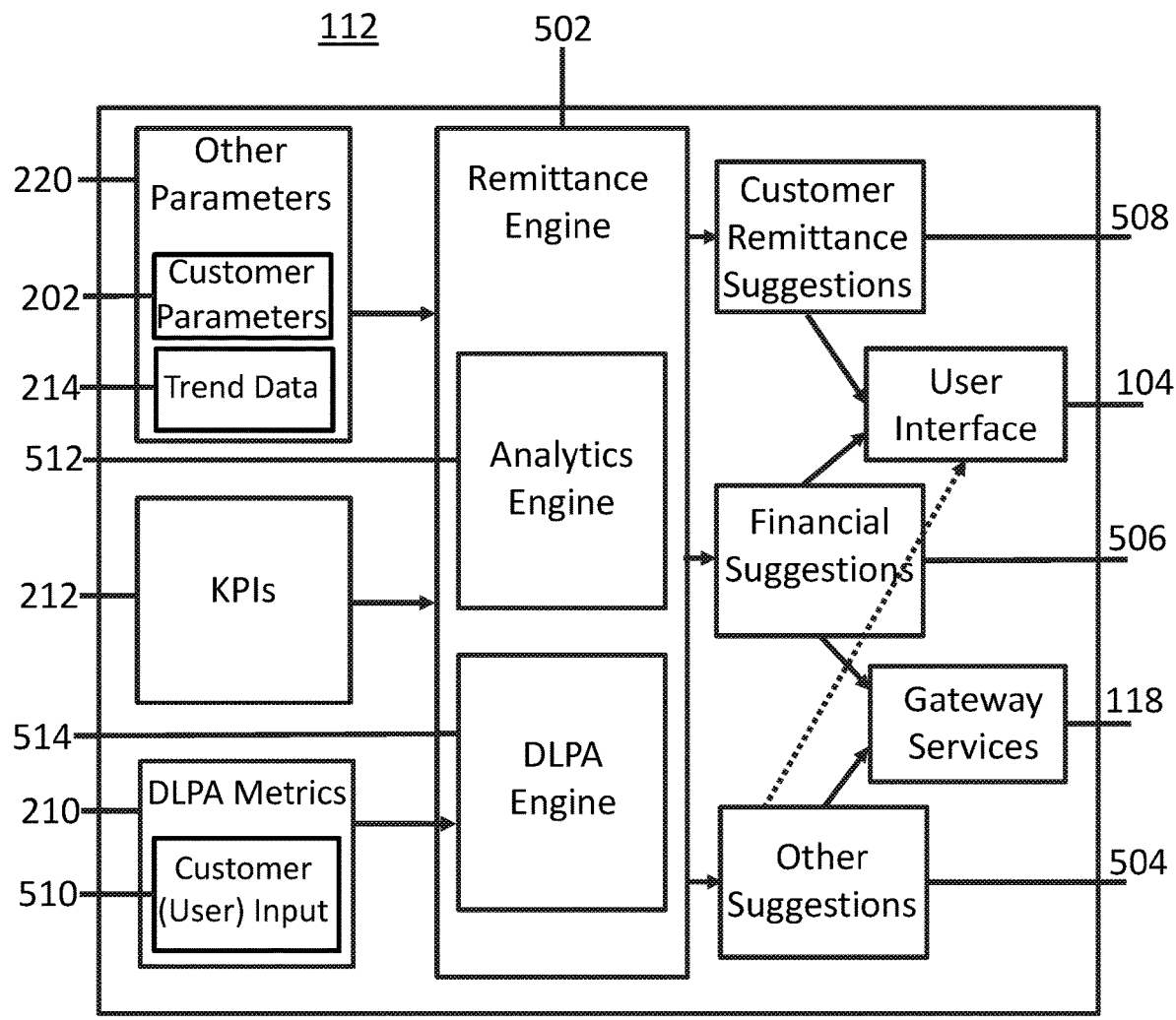
FIG. 5 is a block diagram of the dynamic lightweight personalized analytics (DLPA) engine, in accordance with exemplary embodiments of the disclosure.

FIG. 5 is a schematic block diagram illustrating one embodiment of the remittance analytics engine 112, the foundation for DLPA. It includes the analytics engine 502, which accepts customer parameters 202 and remittance trends 214 as input. They collectively form the other parameters 220 set of inputs. Other input metrics include the KPIs 212 and DLPA Metrics 210. The DLPA Metrics 210 are impacted by responses to customer remittance suggestions 508. Such responses are contained in the customer input data 510, a component of the DLPA metrics 210. Outputs for the analytics engine 502 include customer remittance suggestions 508, financial suggestions 506 and other suggestions 504.

The customer remittance suggestions 508, financial suggestions 506 and other suggestions 504 may communicate their suggestions to the customer through the user interface 104. The financial suggestions 506 and other suggestions 504 communicate their suggestions to external entities (e.g., banks, etc.) via gateway services 118.

The analytics engine 502 may represent a primary computational engine for leveraging predictive, customer behavioral and other analytics techniques for optimal customer remittance suggestions 508, financial suggestions 506 and other suggestions 504 for DLPA. It further utilizes a plurality of customer parameters 202, remittance trends 214, KPIs 212 and DLPA Metrics 210 as input for its calculations. The number of these input factors may be constant or change dynamically and may depend on how they optimize the plurality of outcomes.

Customer remittance suggestions 508 may include recommendations for sending additional funds to one or a plurality of recipients, increasing the frequency of sending funds to one or a plurality of recipients, or other similar suggestions. Moreover, the customer may agree to specific transfer amounts and frequency, based on certain analytics triggers, upon customer registration, by default or dynamically. Financial suggestions 506 may include creating one or a plurality of finance accounts, based on customer preferences 314. The type and number of accounts may be determined upon customer registration for the remittance service, by default, or dynamically. The number, type, or frequency of other suggestions 504 may be determined in a similar manner.

Figure 6:
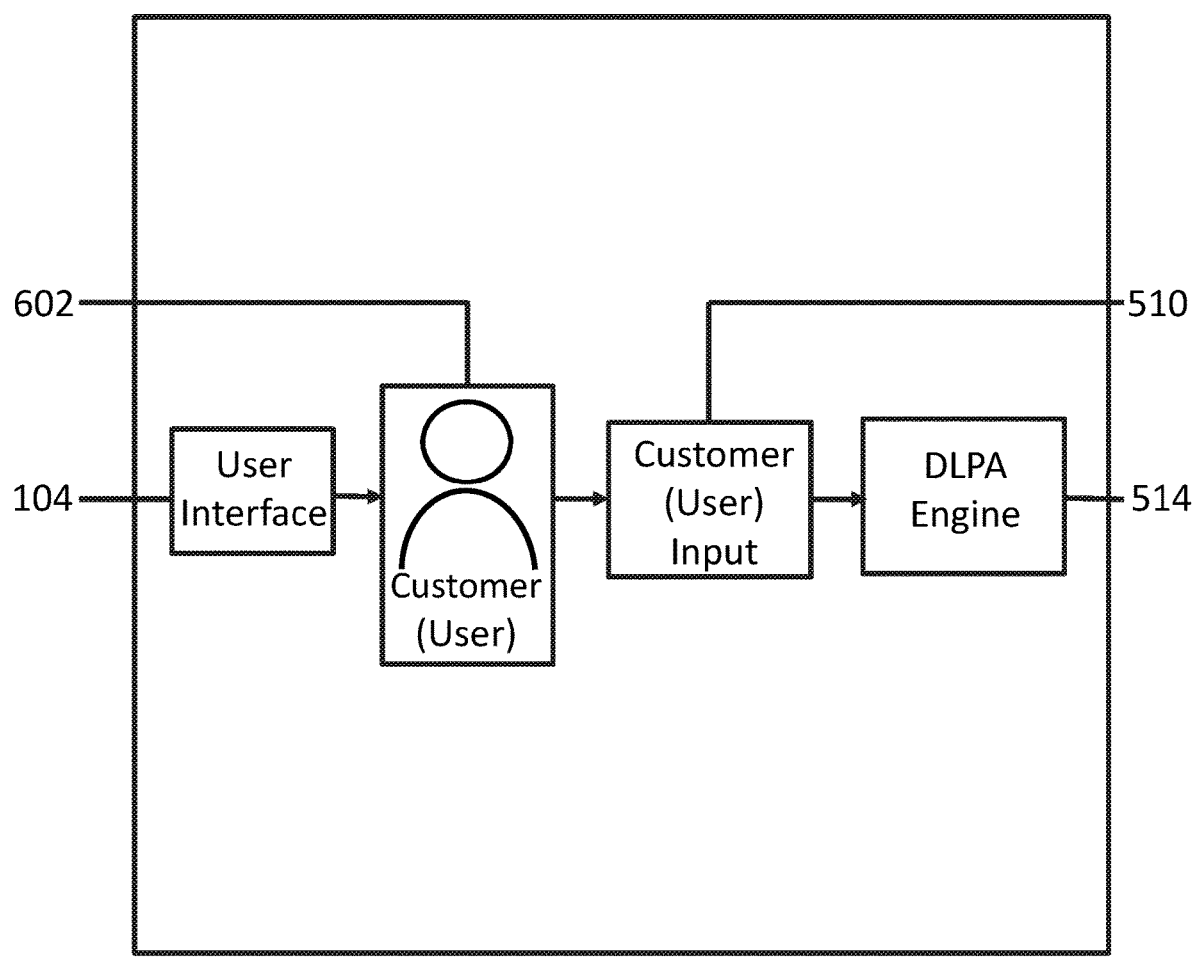
FIG. 6 is a block diagram of the feedback flow of input from the customer to the dynamic lightweight personalized analytics (DLPA) engine, in accordance with exemplary embodiments of the disclosure.

FIG. 6 is a schematic block diagram illustrating one embodiment of the feedback flow of information 600 from the user interface 104 to the customer (user) 602. Once the customer 602 responds to customer remittance suggestions 508, financial suggestions 506 or other suggestions 504, the customer input 510, which is a component of the DLPA Metrics 210, may be considered by the DLPA engine 514.

Figure 7:
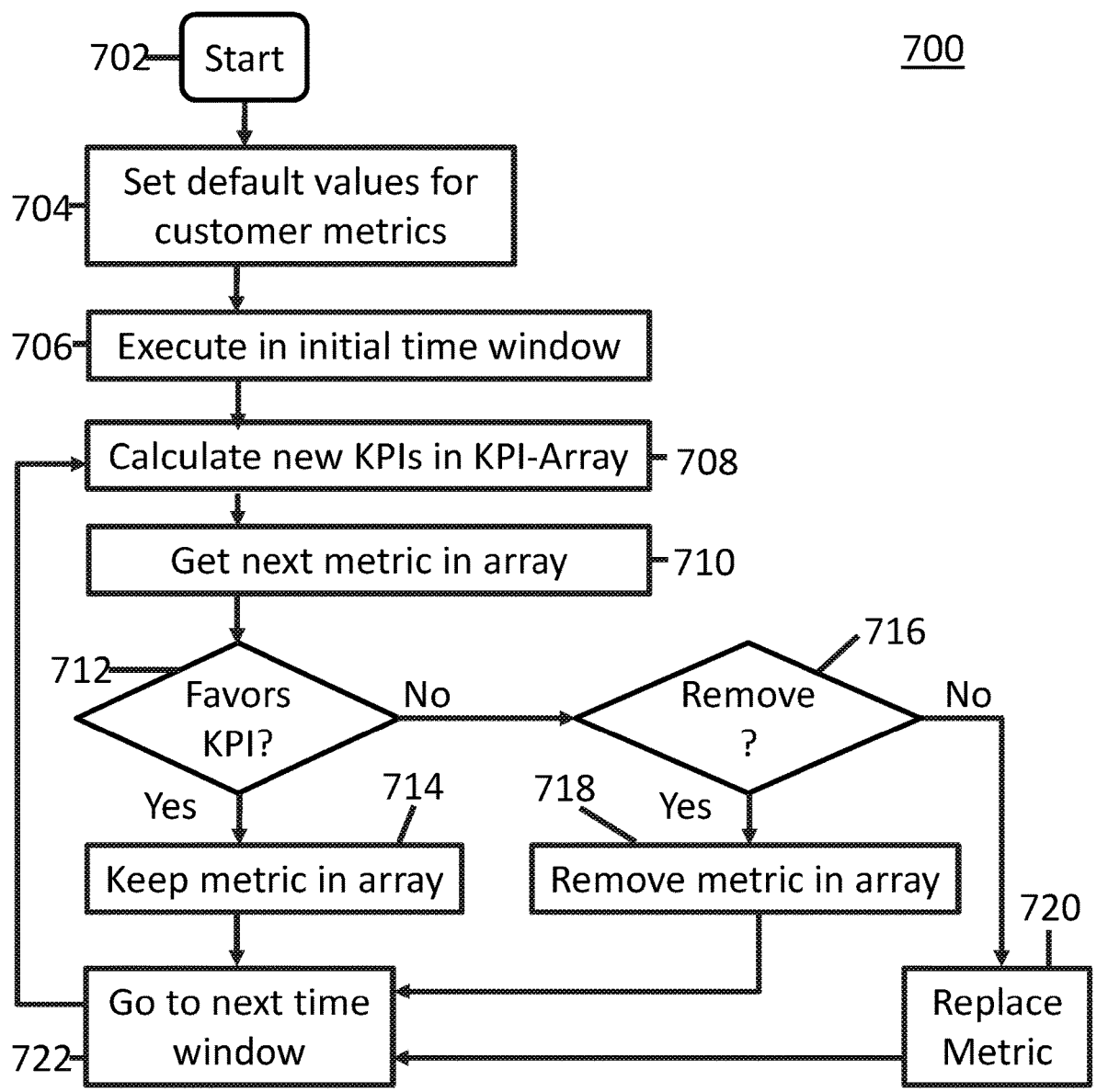
FIG. 7 is a flowchart illustrating an exemplary method for selecting the customer metrics to be used by DLPA, in accordance with exemplary embodiments of the disclosure.

FIG. 7 is flow chart illustrating one embodiment of the DLPA methodology for choosing or adjusting the key DLPA-Metrics 210 to be used for a given customer 700. From the start 702, certain parameters will have non-zero default values that need to be set, as shown by 704. They may include: the time window (TW), the (KPI-Max), the fraction of recommendations that are local versus global (LG-Mix), the minimum value for total funds transferred (TFT-Min), the minimum value for total balances in financial accounts (TB-Max, assuming the existing of financial accounts), the maximum number of entries in the recommendations array (Rec-Array-Max), the maximum DLPA metrics to be considered per customer (DLPA-Max), the memory footprint of each DLPA-Metric, the trigger used to determine whether to keep, add or remove a DLPA entry from DLPA-Array (DLPA-Trigger), and a flag to determine whether to remove or replace a DLPA entry (REMOVE). The DLPA algorithm initially sets these parameters to their defaults. Furthermore, a favorability metric may be associated with each DLPA-Array entry. This metric may be a counter to determine the number of times the specific metric in the DLPA-Array increases a specific KPI 212. The favorability values (e.g., counter) may also have default values.

The flow chart 700 is a depiction of a long-term dynamic execution strategy. Therefore, each DLPA metric 210 is individually changed and evaluated in each time window, beginning with the initial time window 706. As a result, it may take several TWs before the full impact of all DLPA metrics 210 is determined. TW may represent time window, a given time frame for calculating parameters.

Next, for a given time window, TW(i), an embodiment of the present invention may calculate the KPIs 212 in the KPI-Array 708 for the given customer. Once this is done the next step is to calculate the new value of the next element 710 in the DLPA-Array, the current metric (CM). This may include updates to the memory footprint and computational times for each metric. If a KPI 212 value increased over this time window, TW(i), record this in the DLPA-Array for CM (e.g., increase the favorability count for CM).

Using the favorability metrics 712 in the DLPA-Array, determine whether to keep the CM, remove it, or replace it. For example, if the favorability count for CM is greater than or equal to DLPA-Count-Trigger, then keep the DLPM metric 714. If it is less than DLPA-Count Trigger, then remove or replace. There can even be a REMOVE flag. If REMOVE 716 is true, then remove the metric 718. If not, then the DLPA metric 210 is replaced by another metric 720. The replacement algorithm may be round robin, most recently used (MRU), or some other well-known replacement strategy. One may also have two or more triggers for keeping, removing, or replacing the DLPA metric 210. The REMOVE flag 716 may or may not be used in such situations.

Another embodiment may consider the memory footprint and/or the computational times for each DLPA metric 210. Consider the scenario where several DLPA metrics 210 have the same or similar impact on KPIs 212; however, there is a limited number of DLPA metrics to be considered per customer. In such situations, the DLPA metrics with the smallest memory footprints, and/or execution times, will remain in the DLPA-Array while the others are removed.

The next step is to go to the next time window 722, then start the process again, by computing the KPIs 708 in this new time window, etc.

The same (or similar) evaluation methodology may be utilized to determine the list of other parameters (OPs) 220 to be considered for the specific customer. In these instances, each OP 220 in the OP-Array may be individually evaluated for a given TW(i) to determine its impact on the KPIs 212 per customer. In addition, the new memory footprint and computation time may be calculated for the OP 220. For example, they may be added, removed, or replaced using the same (or similar) type algorithm. In addition to (or instead of) this, the OPs 220 may also be impacted by the analytics engine 512 component of the remittance engine 502.

These are examples using one TW to determine the impact of a single DLPA-Metric 210 or OP 220 on the KPIs 212 for an individual customer. This can be enhanced to leverage two or more TWs. In such situations, the targeted metrics may be calculated for each TW(i), over the course of the larger time frame, or just for the larger time frame. In such situations, the impact of the KPIs 212 may be evaluated based on the trend over the course of the multiple time windows. Those skilled in the art are knowledgeable of such embodiments.

As with internal and external events, there are many ways to suggest the creation or funding of financial accounts using analytics, whether it be behavioral or other types analytical algorithms. These various embodiments may be leveraged as part of this process. Furthermore, the recommendations shown are examples in this embodiment and may be enhanced. Various other parameters and suggestions may be leveraged in a similar method in other embodiments, which will be apparent to persons having skill in the relevant art.

DLPA Metrics may represent parameters used in DLPA methodology. Exemplary metrics may include the following:
  RAR: recommendation acceptance rate; the fraction of all recommendations per customer accepted.
  RI: recommendation impact; the fraction of all recommendations resulting in an increase in at least one KPI (new KPI value greater than or equal to current KPI value) in KPI-Array.
  AI: acceptance impact; the fraction of all customer accepted recommendations resulting in an increase in at least one KPI in KPI-Array.
  AAR: financial account acceptance rate; the fraction of all financial account recommendations per customer accepted.
  FM: financial recommendation impact; fraction of all financial account recommendations resulting in an increase in at least one KPI in KPI-Array.
  ORI: other recommendations impact; fraction of all non-financial-account recommendations resulting in an increase in at least one KPI in KPI-Array.
  Rec-Array: an array of past recommendations to the customer, including the type of recommendation (e.g., financial or other), and whether accepted.
  Rec-Array-Max: the maximum number of entries in the Rec-Array.
  SI: support impact; fraction of favourable support outcomes resulting in an increase in at least one KPI in customer's KPI-Array.
  CI: communications impact; fraction of favourable communications outcomes resulting in an increase in at least one KPI in customer's KPI-Array.
  DLPA-Array: a collection the DLPA metrics of focus per customer, and whether it favourably impacted each KPI per customer. This array may also include the memory footprint of each parameter and the time needed to compute its value and associated values (e.g., the time needed to compute the impact of each entry on entries in the KPI-Array).
  DLPA-Count-Trigger: used to determine when to remove or replace a DLPA metric.
  DLPA-Max: the maximum number of DLPA metrics considered per customer.
  REMOVE: a flag to determine whether to remove or replace a DLPA metric in DLPA-Array.

Key Performance Indicators (KPIs) may include the following:
  TFT: Total funds transferred per customer (sender)
  TFT-Min: the minimum value for TFT
  TNT: Total number of transfers per customer
  TB: Total balances in all financial accounts per customer
  TB-Min: the minimum value for TB
  NR: Total number of recipients per customer
  NFA: Total number of financial accounts per customer
  KPI-Array: a collection of the KPIs of focus per customer
  KPI-Max: the maximum number of KPIs considered per customer LG-Mix may represent a fraction of all DLPA suggestions (local and global) that are local.

Other Parameters may include DLPA parameter and trend data as described in U.S. Provisional Application No. 62/868,950 and U.S. patent application Ser. No. 16/914,629, the contents of which are incorporated herein in their entirety.

Examples may include the LG-Mix, transaction data, external events, social media data, geolocation data, communications data, recipient data, milestone events, trend data, etc.
  OP-Array: an array of other parameters used for the specific customer; this array may also include the memory footprint of each parameter, as well as associated computation times for calculating its value and impact on KPIs.
  OP-Max: the maximum number of OPs considered per customer.

TW-Trigger may represent the number of time windows surpassed before executing decision-making actions (e.g., executing an action if a KPI has reached its minimum value).

Reference throughout this specification to "one embodiment," "an embodiment," or similar language means that a feature, structure, or characteristic described about the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of an embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labelled as modules, to emphasize their implementation independence more particularly. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The invention claimed is:

1. A system for providing dynamic lightweight personalized analytics (DLPA), the system comprising:
    an interface that receives one or more inputs via an enterprise payments services bus;
    a data store that stores and manages DLPA metrics; and
    a special purpose computer, comprising one or more processors, and further comprising a dynamic lightweight personalized analytics engine and communicatively coupled to the interface, the special purpose computer programmed to perform the steps of:
    receiving one or more customer parameters and remittance trends;
    accessing, via a customer account database, one or more key performance indicators (KPIs);
    accessing one or more DLPA metrics; wherein the DLPA metrics are impacted by one or more responses to a customer remittance suggestion;
    adjusting each of the one or more DLPA metrics for a predetermined time window for an individual customer; the step of adjusting comprising:
        setting DLPA default values for time window (TW);
        for the time window, calculate a new KPI in a KPI array;
        applying a favorability metric that determines whether to keep a current metric or remove the current metric;
    dynamically processing a plurality of transaction data based on the one or more adjusted DLPA metrics;
    based on the processing step, generating a set of remittance suggestions and financial suggestions; and
    communicating the set of remittance suggestions and financial suggestions.

2. The system of claim 1, wherein the DLPA metrics comprise one or more of: recommendation acceptance rate; recommendation impact; acceptance impact, financial account acceptance rate; financial recommendation impact, an array of past recommendations to the customer.

3. The system of claim 1, wherein the DLPA metrics comprise one or more of: support impact, communications impact.

4. The system of claim 1, wherein KPI represents total funds transferred;
    total number of transfers, total balances, total number of recipients, and total number of financial accounts.

5. The system of claim 1, wherein the transaction data comprises one or more of: milestone events, social media data, and geolocation events.

6. The system of claim 1, wherein the computer processor is further configured to perform the step of:
    adjusting each of the one or more DLPA metrics for a next time window for the individual customer.

7. The system of claim 1, wherein the DLPA metrics represent a predetermined number of customer-specific and industry focused input parameters.

8. The system of claim 1, wherein the dynamic lightweight personalized analytics engine is executed to gain insights for customized services in real-time.

9. A method for providing dynamic lightweight personalized analytics (DLPA), the method comprising the step of:
    receiving, via an interface, one or more customer parameters and remittance trends;
    accessing, via a customer account database, one or more key performance indicators (KPIs);
    accessing one or more DLPA metrics; wherein the DLPA metrics are impacted by one or more responses to a customer remittance suggestion;
    adjusting, via a special purpose computer programmed to conduct the step of adjusting and comprising one or more computer processors, and further comprising a dynamic lightweight personalized analytics engine, each of the one or more DLPA metrics for a predetermined time window for an individual customer; the adjusting comprising:
        setting DLPA default values for time window (TW);
        for the time window, calculate a new KPI in a KPI array;
        applying a favorability metric that determines whether to keep a current metric or remove the current metric;
    dynamically processing a plurality of transaction data based on the one or more adjusted DLPA metrics;
    based on the processing step, generating a set of remittance suggestions and financial suggestions; and
    communicating the set of remittance suggestions and financial suggestions.

10. The method of claim 9, wherein the DLPA metrics comprise one or more of: recommendation acceptance rate; recommendation impact; acceptance impact, financial account acceptance rate; financial recommendation impact, an array of past recommendations to the customer.

11. The method of claim 9, wherein the DLPA metrics comprise one or more of: support impact, communications impact.

12. The method of claim 9, wherein KPI represents total funds transferred; total number of transfers, total balances, total number of recipients, and total number of financial accounts.

13. The method of claim 9, wherein the transaction data comprises one or more of: milestone events, social media data, and geolocation events.

14. The method of claim 9, further comprising the step of:
adjusting each of the one or more DLPA metrics for a next time window for the individual customer.

15. The method of claim 9, wherein the DLPA metrics represent a predetermined number of customer-specific and industry focused input parameters.

16. The method of claim 9, wherein the dynamic lightweight personalized analytics engine is executed to gain insights for customized services in real-time.

17. A computer-readable medium comprising instructions which, when executed by a special purpose computer, cause the special purpose computer to carry out steps of:
receiving, via an interface, one or more customer parameters and remittance trends;
accessing, via a customer account database, one or more key performance indicators (KPIs);
accessing one or more dynamic lightweight personalized analytics (DLPA) metrics;
wherein the DLPA metrics are impacted by one or more responses to a customer remittance suggestion;
adjusting, via the special purpose computer programmed to conduct the step of adjusting and comprising one or more computer processors, and further comprising a dynamic lightweight personalized analytics engine, each of the one or more DLPA metrics for a predetermined time window for an individual customer; the adjusting comprising:
setting DLPA default values for time window (TW);
for the time window, calculate a new KPI in a KPI array;
applying a favorability metric that determines whether to keep a current metric or remove the current metric;
dynamically processing a plurality of transaction data based on the one or more adjusted DLPA metrics;
based on the processing step, generating a set of remittance suggestions and financial suggestions; and
communicating the set of remittance suggestions and financial suggestions.

18. The computer-readable medium of claim 17, wherein the DLPA metrics comprise one or more of: recommendation acceptance rate; recommendation impact; acceptance impact, financial account acceptance rate; financial recommendation impact, an array of past recommendations to the customer.

19. The computer-readable medium of claim 17, wherein KPI represents total funds transferred; total number of transfers, total balances, total number of recipients, and total number of financial accounts.

20. The computer-readable medium of claim 17, wherein the DLPA metrics represent a predetermined number of customer-specific and industry focused input parameters.

\* \* \* \* \*